March 22, 1932.   L. BARNETT   1,850,165
ELECTRIC SWITCH OR JUNCTION BOX
Filed May 4, 1931
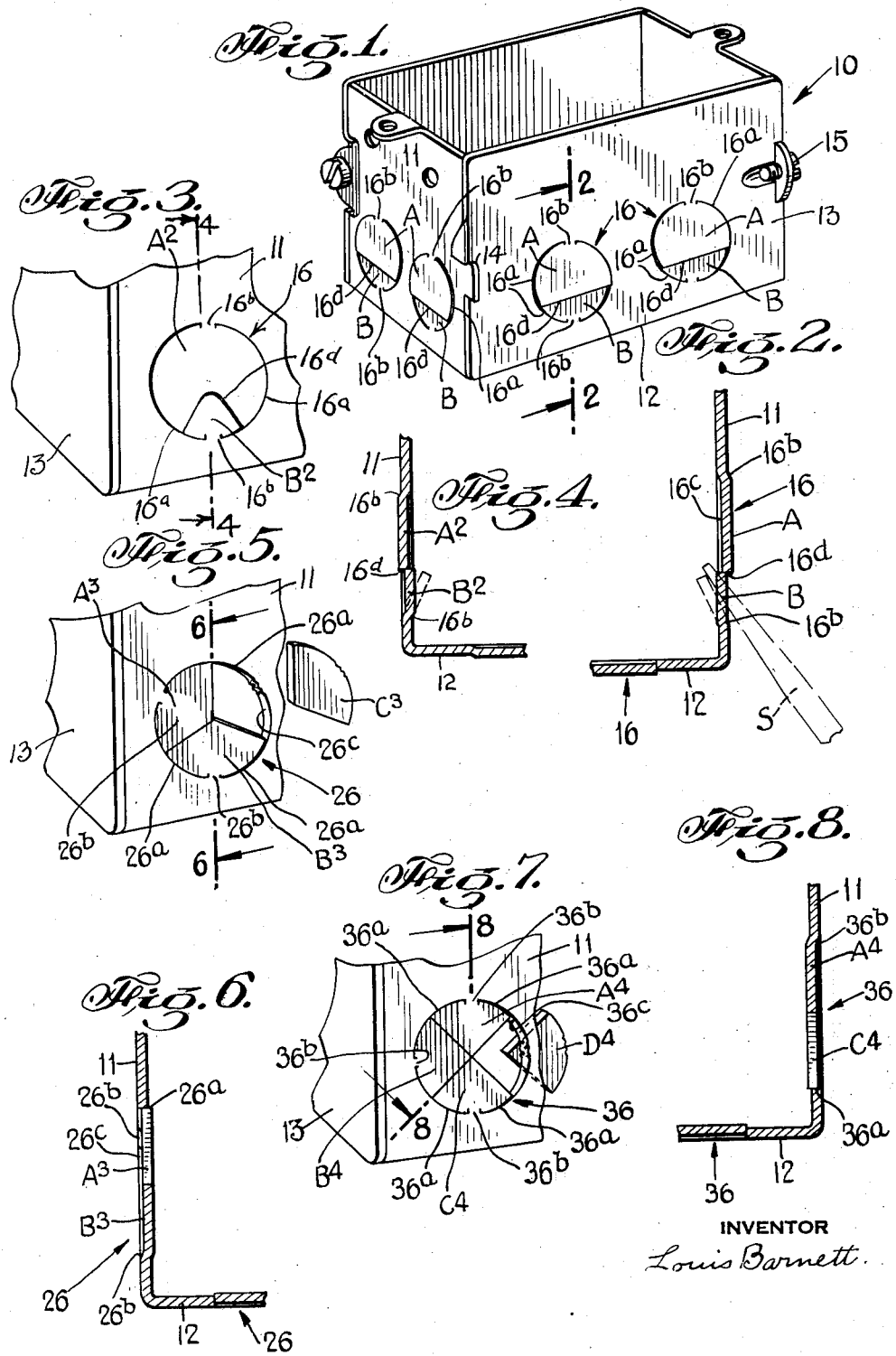
INVENTOR
Louis Barnett.

Patented Mar. 22, 1932

1,850,165

UNITED STATES PATENT OFFICE

LOUIS BARNETT, OF BROOKLYN, NEW YORK

ELECTRIC SWITCH OR JUNCTION BOX

Application filed May 4, 1931. Serial No. 534,713.

This invention relates to "knock-outs" for sheet metal electric switch or junction boxes and more particularly is directed to an improved construction of "knock-outs" whereby their removal is facilitated.

Among the objects of the invention is to generally improve the construction of "knock-outs" for electric switch and junction boxes which can be dislodged and readily removed from their seated position from the exterior side of the box to eliminate possible interference with the cable clamping devices or wiring connections within the box, said "knock-out" construction being formed of few and simple parts, which shall be cheap to make, and practical and efficient to a high degree of use.

Other objects of this invention will in part be obvious and in part hereinafter pointed out.

The invention accordingly consists in the features of construction, combinations of elements and arrangement of parts which will be exemplified in the combination hereinafter described and of which the scope of application will be indicated in the following claims.

In the accompanying drawings, in which is shown various possible illustrative embodiments of this invention.

Fig. 1 is a perspective view of an electric switch or junction box formed with one construction of "knock-outs" embodying the invention.

Fig. 2 is a cross-sectional view taken on lines 2—2 in Fig. 1.

Fig. 3 is a fragmentary perspective view showing a switch box formed with a modified construction "knock-out" embodying the invention.

Fig. 4 is a cross-sectional view taken on lines 4—4 in Fig. 3.

Fig. 5 is a fragmentary perspective view showing a switch box formed with a three-part, "knock-out" constructed to embody the invention, one section of the "knock-out" being shown dislodged from its attached position.

Fig. 6 is a cross-sectional view taken on lines 6—6 in Fig. 5.

Fig. 7 is a fragmentary perspective view showing a switch box formed with a four-part "knock-out" constructed to embody the invention, one section of said "knock-out" being shown dislodged from its attached position, and Fig. 8 is a cross-sectional view taken on lines 8—8 in Fig. 7.

Referring in detail to the drawings, 10 denotes an electric switch or junction box of conventional construction formed of steel stamping parts having end-walls 11 usually formed integral with a bottom side of the box 12 and detachable side walls 13, the latter being retained in position through interlocking connections 14 and screw fastenings 15 in the well understood manner, and as shown in Fig. 1.

The box 10 has "knock-outs" 16 which are provided in the end-walls 11, the bottom side 12 of the box, and in the side walls 13. These "knock-outs" 16 may be of any desired shape, preferably being circular and of a diameter to permit when removed the free passage of a standard size electric conduit or cable (not shown). The "knock-outs" 16 may be formed in the well understood manner by a punch and die, the metal of the walls or side of the box being severed along broken lines 16a to form peripheries of the "knock-outs" and leaving unsevered portions 16b between said lines for retaining the "knock-outs" in position as removable closures for openings 16c in the walls 11, 12 or side 13 wherethrough the conduit or cable passes. As shown in Fig. 1, the "knock-outs" are each of two-part construction, A and B. each part being retained in position within the opening 16c by one of the unsevered portions 16b. Said parts are formed by shearing the "knock-outs" along lines 16d which extends transversely thereof to the peripheries forming said parts A and B in segment-shaped portions. If desired, the segment-portion A is pressed slightly outwardly with respect to the plane of the wall 11 while the segment-portion B is pressed slightly inwardly with respect to the plane of the wall 11, to facilitate the dislodgment of said segment portions in the manner hereinafter described.

The cable clamping means, switch parts and wiring connections usually housed inside the box 10 (not shown) are often positioned in close proximity to the "knock-outs" 16 and therefore much inconvenience is experienced when it is found necessary to dislodge a "knock-out" 16 for clearing the box opening 16c prior to insertion of a cable or conduit since it is the usual practice to force the "knock-out" into the box. The improved "knock-out" 16 can be readily dislodged from the exterior side of the box without the necessity of reaching into the box and with the least disturbance or interference with the cable clamping means, switch parts or wiring connections within the box. This is readily accomplished by simply forcing one of the segment-portions A or B of the "knock-out" 16, preferably segment-portion B which is normally pressed slightly inward, into the box a sufficient distance to provide a space for permitting the insertion of a suitable prying tool, such as an end of a screw driver blade S, between the segment-portions A and B, then by resting the blade against the rim of the opening 16c which serves as a fulcrum and swinging the screw driver, the segment-portion A can be pried outwardly from the opening 16c (see Fig. 2). When said segment-portion A is bent out sufficiently from the plane of the wall 11, the unsevered portion 16b which connects and retains same in position will break off permitting the removal thereof. The sector-portion B may then be dislodged and removed either by forcing it inwardly or outwardly until the unsevered portion 16b which retains it to the wall 11 breaks off leaving the opening 16b free for receiving an end of an electric cable or conduit (not shown). It is to be understood that the segment-portions A and B may be equal or unequal in size, or may be of any other suitable shape, as for example sector-shaped to form portions A2 and B2 shown in Figs. 3 and 4 instead of being made segment-shaped.

In Figs. 5 and 6, another embodiment of the invention is shown comprising a "knock-out" 26 formed of three-parts, A3, B3 and C3. When said "knock-out" 26 is circular, said parts form sector-shaped portions, each of which is preferably connected to the wall 11 by a single unsevered portion 26b, the latter being spaced between the broken lines 26a forming the periphery of the "knock-out". To remove the "knock-out" 26, one of the sector-portions may be forced into the box sufficiently to provide a space for inserting an end of a prying tool, and the remaining sector-shaped portions may then be pried outwardly in the same manner as described above for the "knock-out" 16. In Fig. 5, the sector-portion C3 is shown detached from the wall 11 and removed from its position in the opening 26c giving access to outwardly pry the other two sector-shaped portions A3 and B3. It is to be understood that it is not necessary to force the sector-portion C3 into the box until detachment thereof takes place. All that is required is that one or more of said sector-portions be pressed in until a space is provided to permit the insertion of a prying tool, then it is obvious that all the sector-portions may be pried loose and removed in a direction towards the exterior side of the box.

In Figs. 7 and 8, a four-part "knock-out" construction 36 is shown embodying the invention. Here the parts or sector-shaped portions A4, B4, C4 and D4 are each connected to the wall 11 by the unsevered portions 36b, the latter being spaced between the broken lines 36a. Sector-portions A4, B4, C4 and D4 are dislodged and removed from the opening 36c in the same manner as described above for the "knock-out" 26, that is, by forcing one or more of the sector-portions inwardly a sufficient distance to provide a space for inserting a prying tool and then prying the sector-portions outwardly.

It should be noted that since the "knock-outs" 16, 26 and 36 are sectionalized, the parts thereof may be made small enough to be readily removed through the wall openings should they fall inside the box.

Each "knock-out" 16, 26 or 36 provides a complete closure for its respective opening 16c, 26c or 36c, so that no communications are normally provided between the interior and exterior side or walls of the box through the "knock-out" structures. The latter snugly fit their respective openings and thereby preclude possible fire hazard in case of defects in the wiring or arcing of the switch parts within the boxes by providing sectionalized positive closures which are removable without interfering with the wiring or cable clamping means in the boxes.

Since electric switch boxes having "knock-outs" are often installed against and adjacent portions of building structures, such as beams, difficulty is frequently experienced in removing the "knock-outs" because the space available for prying is restricted. To overcome such condition convenient means for selectively prying the sectionalized parts of the "knock-out" free from their openings in a plurality of directions is provided. Thus, in removing the "knock-out" 16, after the part B is displaced for insertion of the screw driver blade S, the part A may be pried loose from a plurality of directions. That prying direction is used which is most convenient and is unobstructed. In removing the "knock-outs" 26 or 36, the sector-shaped portions thereof first selected for dislodgment would be the one that would permit the other sector-shaped portions to be most conveniently pried loose.

It will thus be seen that there is provided means whereby the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A wall of a junction box having an opening, a "knock-out" in the opening, said "knock-out" comprising sections completely severed from one another, each section being attached to the rim of said opening and being displaceable from said opening independently to the other sections.

2. The junction box wall and "knock-out" defined in claim 1 in which two of the sections are positioned to extend in different planes.

3. The junction box wall and "knock-out" defined in claim 1 in which said sections are retained to form a complete closure for said opening, and one of said sections is positioned out of the plane of the box wall.

4. In a switch box of the character described, a "knock-out" having a periphery cut from the wall of the box along a broken line, said "knock-out" being severed through a mid-portion and periphery thereof to provide separable parts each attached to uncut portions of said wall.

5. In an electric switch box of the character described, a wall having separable sections partially severed therefrom, each section being attached in position to an unsevered portion of the wall independent of the other sections to provide a "knock-out" in an opening, said separable sections being each selectively displaceable to permit prying the other separable sections from the opening, these sections being severed from each other.

6. An electric switch box having severed wall sections retained in position to provide a closure "knock-out" in an opening, said "knock-out" sections each extending to a different portion of the periphery of said opening, these sections being severed from each other.

7. An electric switch box having severed wall portions retained in position to provide a "knock-out" in an opening, said "knock-out" comprising severed sections each extending to a different part of the periphery of the "knock-out", each section being detachably secured to the wall of the box independent of the other sections.

8. A punched "knock-out" formed in a wall of an electric box having a periphery severed along broken lines, said "knock-out" being cut along a line extending from two adjacent portions of said severed broken line to sub-divide the "knock-out" into parts for independent displacement from a normal position.

9. A punched "knock-out" formed in a wall of an electric box cut to provide severed adjoining segment-shaped parts so constructed and arranged to permit selective displacement of any of said parts for prying any other part.

10. A punched "knock-out" formed in a wall of an electric box, said "knock-out" being sectionalized into severed sector-shaped parts so constructed and arranged to permit selective displacement of any part for prying any other sector-shaped part.

In testimony whereof, I affix my signature.

LOUIS BARNETT.